United States Patent [19]
Watanabe et al.

[11] Patent Number: 5,745,225
[45] Date of Patent: Apr. 28, 1998

[54] APPARATUS FOR MEASURING A SHAPE OF ROAD SURFACE

[75] Inventors: Hiromitsu Watanabe; Noriyuki Takeuchi; Tetsuya Arimoto, all of Tokyo, Japan

[73] Assignee: Tokimec, Inc., Tokyo, Japan

[21] Appl. No.: 572,330

[22] Filed: Dec. 14, 1995

[51] Int. Cl.⁶ .............................. G01C 3/08; G01B 11/26
[52] U.S. Cl. .................... 356/4.01; 356/5.01; 356/141.4; 356/376
[58] Field of Search ................ 356/4.01, 5.01, 356/141.4, 141.5, 376

[56] References Cited

U.S. PATENT DOCUMENTS

| | | | |
|---|---|---|---|
| 4,653,331 | 3/1987 | Fukuhara | 73/146 |
| 4,674,327 | 6/1987 | Swindall et al. | 73/146 |
| 4,796,998 | 1/1989 | Soma . | |
| 4,878,754 | 11/1989 | Honma et al. | 356/376 |
| 5,141,307 | 8/1992 | Bennett | 356/1 |
| 5,235,398 | 8/1993 | Miller et al. | 356/5 |
| 5,323,647 | 6/1994 | Blanco | 73/146 |
| 5,515,156 | 5/1996 | Yoshida et al. | 356/5.01 |
| 5,546,188 | 8/1996 | Wangler et al. | 356/376 |

FOREIGN PATENT DOCUMENTS

| | | |
|---|---|---|
| 0170038 | 2/1986 | European Pat. Off. . |
| 1234427 | 6/1971 | United Kingdom . |
| 1583737 | 2/1981 | United Kingdom . |
| 2151872 | 7/1985 | United Kingdom . |
| 2265274 | 9/1993 | United Kingdom . |

OTHER PUBLICATIONS

Japan Abstract of Narutake 3-185310(A) Aug. 1991.
Japan Abstract of Terada 60-122306 (A) Jun. 1985.

*Primary Examiner*—Mark Hellner
*Attorney, Agent, or Firm*—David O'Reilly

[57] ABSTRACT

An apparatus of for measuring roughness of a road surface such as convex, concave or inclination is to be mounted on the vehicle. The apparatus comprises a rotation driving member for generating rotation motion in vertical plane and for outputting a signal concerning its rotation angle. An inclinometer is provided to detect an inclined angle of the rotation driving member. A distance measuring member for measuring distance from road surface as being rotated by the rotation motion from said rotation driving member. A processing unit calculates a vertical distance and a horizontal distance between the apparatus and the road surface by means of the inclined angle detected by the inclinometer and the rotation angle detected by the rotation driving member.

4 Claims, 6 Drawing Sheets

MEASURING STEPS ON THE MEASURING SURFACE

APPARATUS FOR MEASURING A SHAPE OF ROAD SURFACE

BACKGROUND OF THE INVENTION

1. Field of the Invention

This invention relates to an apparatus mounted on a vehicle for measuring roughness of a road surface, such as convex, concave or inclination without contacting the road surface.

2. Background Information

Figures 9, 10, 11:
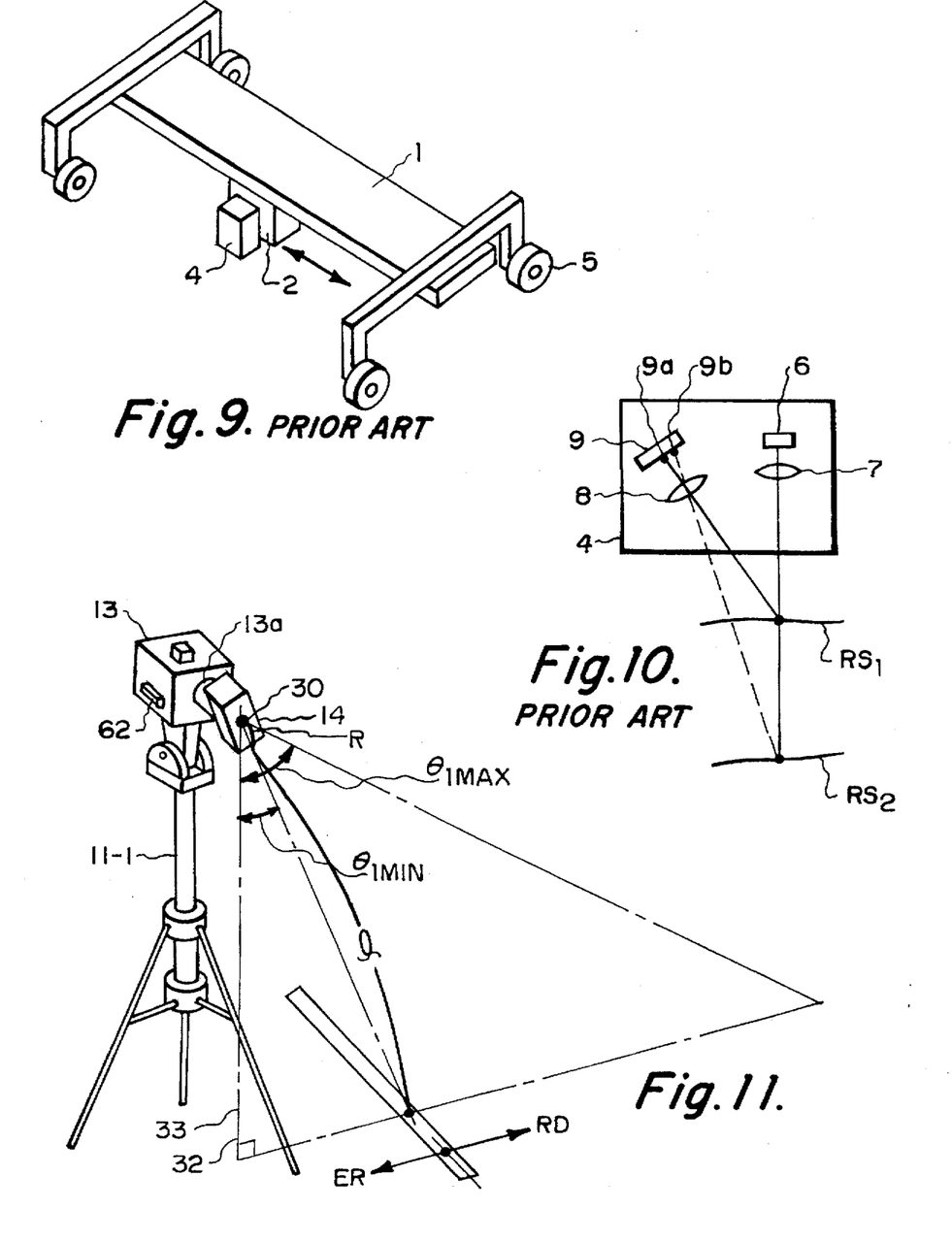
FIG. 9 is a perspective view of an apparatus for measuring the shape of a road surface of a conventional device.
FIG. 10 shows the principle of measuring of the conventional apparatus.
FIG. 11 is a perspective view of an apparatus for measuring the shape of a road surface of the still another embodiment according to the present invention.

A conventional apparatus for measuring roughness of the road surface is shown in FIG. 9. In FIG. 9, reference numeral 1 denotes a main frame having a width corresponding to a road to be measured. Main frame 1 is supported by wheels 5 at its either end. Carriage 2 is supported at the bottom face of main frame 1 so as to slidably run in a longitudinal direction of main frame 1, and measuring member 4 is fixed to carriage 2. As main frame 1 is pulled by the vehicle in its lateral direction, measuring member 4 moves above the road surface.

When measuring the shape of the road surface, carriage 2 is moved in a longitudinal direction of the main frame 1 by a motor not shown and measuring member 4 measures a distance from the road surface.

FIG. 10 shows a principle of measuring according to the apparatus. Measuring member 4 includes laser emitter element 6, projector lens 7, receiving lens 8, and CCD elements 9. Laser light from laser emitter element 6 is projected to the road surface through projector lens 7. Apart of a reflected light from the road surface gathered by receiving lens 8, reaches to CCD elements 9. A position of the received light in CCD elements 9 varies depending on the distance between the road surface and measuring member 4. For example, if the road surface varies from RS1 to RS2, a position of the received light varies from 9a to 9b. Therefore, the distance from the road surface can be known from the receiving position in CCD elements 9, so that it is possible to measure concave or convex on the surface of road by measuring receiving positions as carriage 2 is moved along frame 1.

However, in the conventional apparatus, if a width of the road to be measured becomes longer, for example 3 m, the length of main frame 1 must be longer. Consequently, a mechanism for supporting carriage 2 and a mechanism for driving carriage 2 become bulky, and needs a complicated structure to control precise positions of carriage 2 over an entire running stroke of carriage 2 along the main frame, which results in that not only its cost is increased but the apparatus becomes heavy and a number of necessary human labor stops for carrying and operating is increased.

The frame can be substituted for a telescopic frame which can expand its length to have a longer measuring width than the length of the frame of its shrunk status. However such a mechanism is complicated and has problems in weight and cost.

SUMMARY OF THE INVENTION

To eliminate the above disadvantages, it is an object of this invention to provide an apparatus for measuring roughness of a road face, which is small in size and low in weight.

It is another object of this invention to provide an apparatus for measuring roughness of a road surface in which an operator does not need to get out of the vehicle during measuring and avoids dangerous outdoor works on the road.

It is still another object of this invention to provide an apparatus for measuring roughness of a road surface which can decrease human labor steps.

In this invention, an apparatus for measuring roughness of a road surface such as convex, concave or inclination on the road surface is mounted on the vehicle and comprises a rotation driving member to generate rotation motion in a vertical plane and to output a signal concerning its rotation angle. The apparatus further comprises an inclinometer to detect an inclined angle of the rotation driving member, and a distance measuring member rotated by the rotation motion of the rotation driving member to measure the distance from the road surface. A processing unit calculates the vertical distance and horizontal distance between the apparatus and the road surface by means of the inclined angle detected by the inclinometer and the rotation angle detected by the rotation driving member.

The distance measuring member may be a light wave distance measuring equipment measuring distance by emitting a light wave toward the road surface and receiving the reflected light.

The rotation driving member may comprise a pulse motor for generating the rotation motion, and a pulse motor driver for driving the pulse motor. The pulse motor driver outputs a signal related to the rotation angle of the rotation motion.

Alternatively, the rotation driving member may comprise a pulse motor for generating the rotation motion, a transmission mechanism for transducing the rotation motion from the pulse motor into reciprocal linear motion and further for transducing the reciprocal linear motion into rotation motion in a vertical plane about a certain rotation center of the apparatus, and a pulse motor driver for driving the pulse motor. The pulse motor driver outputs a signal regarding to the rotation angle of the rotation motion from the pulse motor.

The above, and other objects, advantages and novel features of this invention will become apparent from the following detailed description and the accompanying drawings, in which like reference numbers indicate like or similar parts throughout wherein;

DETAILED DESCRIPTION OF THE INVENTION

Figure 1:
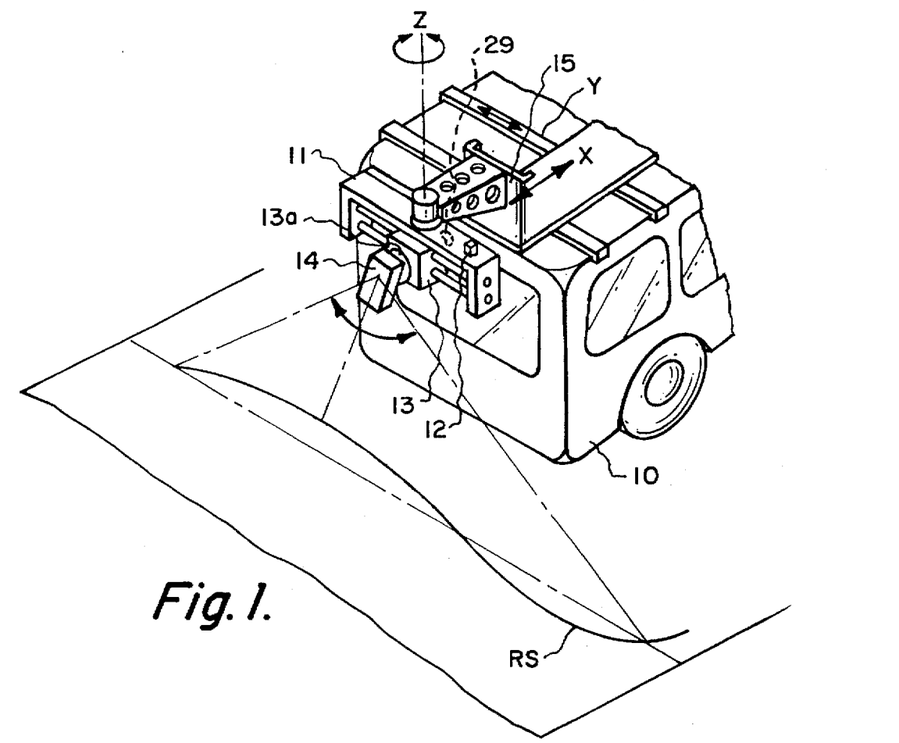
FIG. 1 is a perspective view of an apparatus for measuring the shape of a road surface of an embodiment according to the present invention.

Referring to FIG. 1, an embodiment of the invention is described below. The apparatus for measuring a shape of a road surface of the embodiment is mounted on measuring vehicle 10. Reference numeral 11 denotes a frame fixed on measuring vehicle 10, otherwise supported on measuring vehicle 10 by ON/OFF line carriage 15 if necessary, and its position in a horizontal plane (X-Y plane) and its angular position about a vertical axis (Z axis) are adjusted by carriage 15. Inclinometer 12 is provided on frame 11 for detecting an inclined angle of a longitudinal direction of frame 11 relative to the horizontal plane, and for outputting a signal of the detected incline angle. Rotation driving member 13 fixed to frame 11 includes a driving motor for generating rotary motion, and angular transmitter 29, such as a potentiometer or encoder for detecting the rotational angle of output shaft 13a of the driving motor and for outputting a signal of the detected rotational angle to processing unit 16 explained hereinafter. A signal from the processing unit 16 in accordance with the signal from the transmitter 29 is fed backs to the driving motor which is controlled by this conventional servo control system.

Inclinometer 12 may be directly fixed to the housing of rotation driving member 13 fixed to frame 11 to detect an inclined angle of rotation driving member 13.

Distance measuring member 14 is attached to rotary output shaft 13a of rotation driving member 13. It is desired that attachment of distance measuring member 14 to rotation driving member 13 and attachment of rotation driving member 13 to frame 11 should be completed with a certain precision before frame 11 is fixed to measuring vehicle 10.

Figure 2:
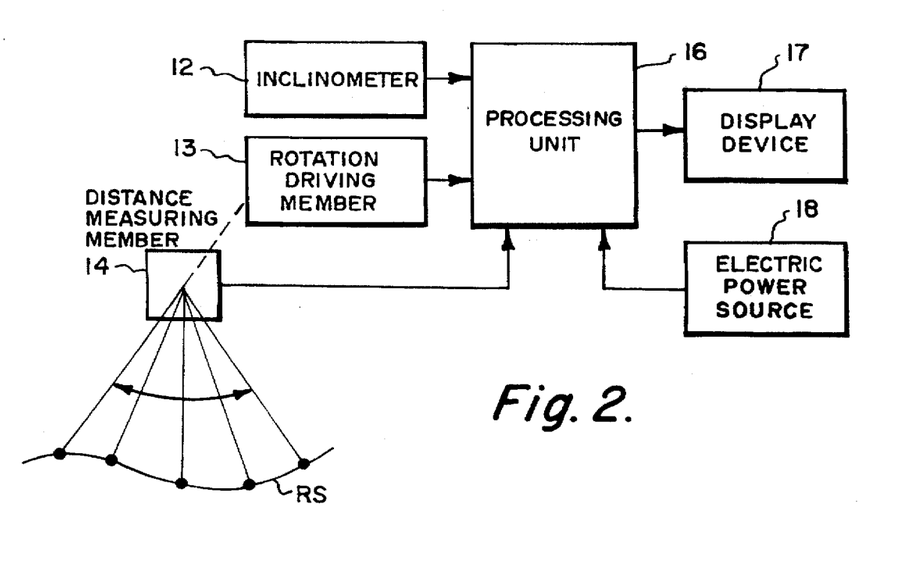
FIG. 2 is a block diagram of the embodiment of FIG. 1.

Distance measuring member 14 is provided with light wave distance measuring equipment 19 (see FIG. 3) which transmits a light wave to a road surface. Distance measuring equipment 19 reciprocally swings right or left in a vertical plane by rotation driving member 13 so that the light axes of light from equipment 19 traverse the road surface. As shown in FIG. 2, the signal from light wave distance measuring equipment 19 is fed to processing unit 16 mounted on measure vehicle 10, together with the signals from angular transmitter 29 of rotation driving member 13 and from inclinometer 12. Processing unit 16 connects to display device 17. Electric power source 18 is also mounted on measure vehicle 10 and feeds electric power to rotation driving member 13, light wave distance measuring equipment 19, processing unit 16 etc.

Figure 3:
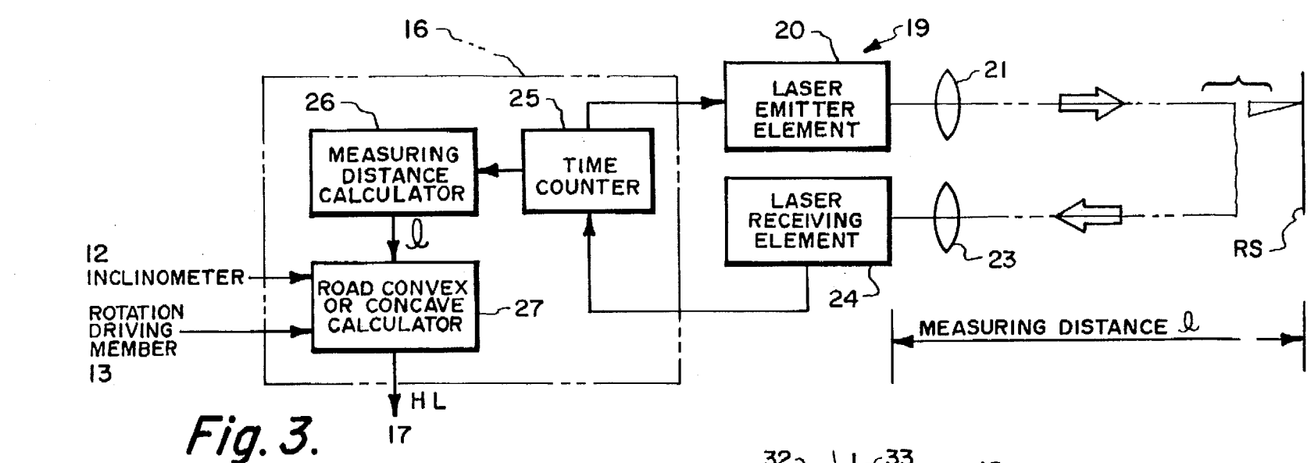
FIG. 3 is a block diagram of a light wave distance measuring equipment and a signal processing unit of the embodiment of FIG. 1.

Processing unit 16 includes time counter 25, measuring distance calculator 26 and road convex or concave calculator 27 (see FIG. 3). Measuring distance calculator 26 calculates a distance from light wave distance measuring equipment 19 to the road surface and road convex or concave calculator 27 obtains data regarding to convex or concave of the road surface by means of the outputs from inclinometer 12 and angular transmitter 29 of rotation driving member 13.

Figure 4:
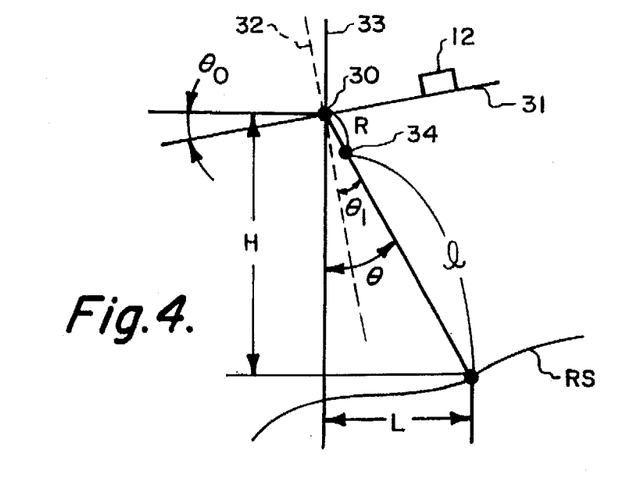
FIG. 4 is an explanatory view showing the operations of the embodiment of FIG. 1.

FIG. 3 shows principle of measuring of light wave distance measuring equipment 19 which includes laser emitter element 20, projector lens 21, receiving lens 23 and laser receiving element 24. Laser emitter element 20 emits laser pulse lights every predetermined time interval, each of which is transduced to a parallel light by projector lens 21 and illuminates road surface RS. A part of a reflected light from road surface RS is gathered by receiving lens 23 and reaches to laser receiving element 24. Time counter 25 of processing unit 16 counts clock pulses from when a trigger signal is fed to laser emitter element 20 to emit the laser, to when the received signal is output from laser receiving element 24, and the number of the clock pulses is transduced to a distance 1 by measuring distance calculator 26. The obtained distance 1 is fed to road convex or concave calculator 27 and processed as follows;

FIG. 4 shows operation of this apparatus. Reference numeral 30 refers to a rotation center of distance measuring member 14. Reference numeral 31 refers to longitudinal direction of frame 11, inclinometer 12 detects inclined angle $\theta_0$ of a longitudinal direction, in other words, inclined angle of a fixed part of rotation driving member 13 deviated from the horizontal plane. Distance measuring member 14 attached to rotary output shaft 13a of rotation driving member 13 swings right or left about rotation center 30 and line 32 perpendicular to rotation driving member 13. Rotation angle 1 deviated from vertical line 32 is output from angular transmitter 29. Offset of light axis of distance measuring member 14 deviated from stet vertical line 33 is obtained by the following equation:

$$\Theta = \Theta_1 + \Theta -;$$

wherein R is a distance from rotation center 30 to reference point 34 of distance measuring member 14 and l is a distance obtained by measuring distance calculator 26. Vertical distance H and horizontal distance L from rotation center 30 to a measuring point on road surface RS are obtained by the following equations.

$$H=(R+1)\cos=(R+1)\cos(\Theta_1-\Theta)$$

$$L=(R+1)\sin=(R+1)\sin(\Theta+0)$$

Consequently, in road convex or concave calculator 27, output 0 from inclinometer 12 and output 1 from angular transmitter 29 of rotation driving member 13 are added and the added angle is used to calculate H and L. The calculated vertical distance H and horizontal distance L between rotation center 30 and the measuring point on the road surface are fed to display device 17 and plotted in a display of display device 17.

Figure 5:
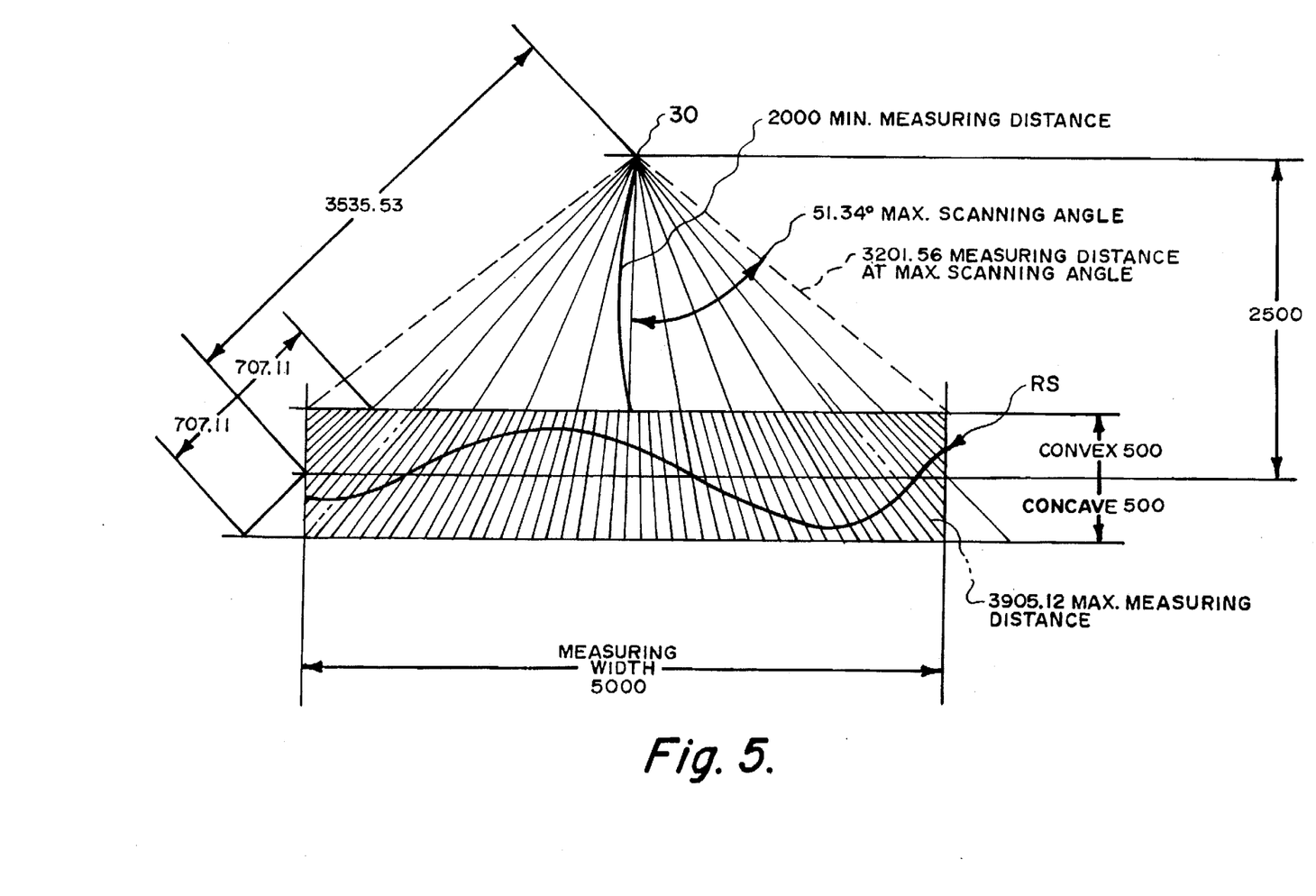
FIG. 5 is a measured result of the apparatus shown in FIG. 1.

FIG. 5 shows an example of a measured result, maximum scanning rotation angle is 51.34 degree, measuring width is 5 m. The lengths in FIG. 5 is shown in mm. Each measuring point is plotted by calculated vertical distance H and calculated horizontal distance L between the measuring point and rotation center 30.

As explained above, it is possible to reduce a size and weight of the apparatus by means of rotating distance measuring member 14 rotated by rotation driving member 13, resulting in low costs and less human labors.

Figure 6:
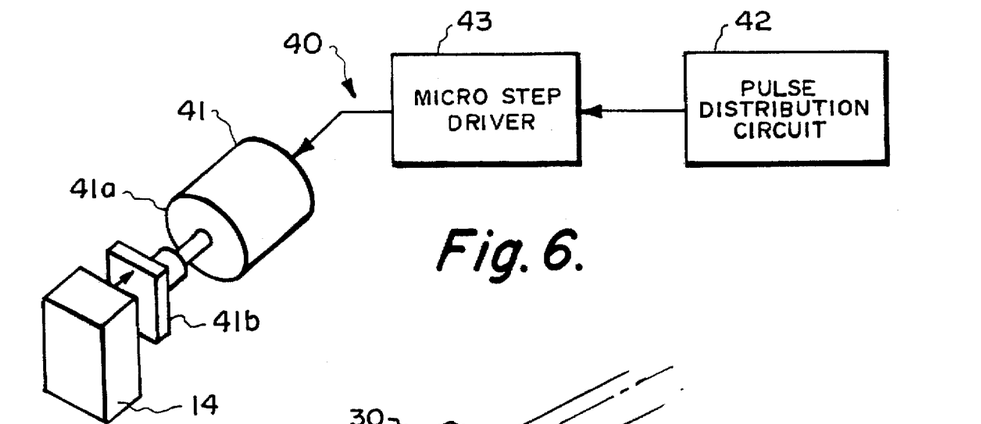
FIG. 6 is perspective view of a rotation driving mechanism for an apparatus to measure the shape of a road surface of an another embodiment of this invention.

FIG. 6 is another embodiment of the rotation driving member. In this embodiment, rotation driving member 40 includes pulse motor 41 as a drive motor, and angular transmitter 29 is omitted. Distance measuring member 14 is attached to output shaft 41a of pulse motor 41 through attaching plate 41a. Rotation driving member 40 further includes pulse distribution circuit 42 and micro step driver 43 connected to distribution circuit 42. Micro step driver 43 drives pulse motor 41 with a precision of a predetermined angle.

It is possible to drive pulse motor 41 by a predetermined stepped angle with a high resolution. Road convex or concave calculator 27 can obtain a signal corresponding to rotation angular signal output $\Theta_1$ of distance measuring member 14 from micro step driver 43.

Figure 7:
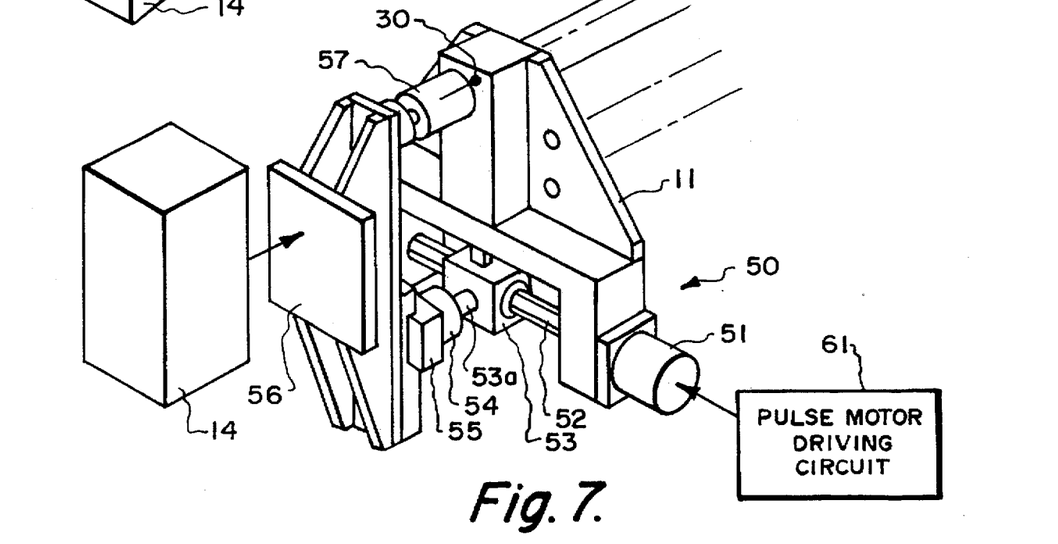
FIG. 7 is a perspective view of a rotation driving mechanism for an apparatus to measure the shape of a road surface of a yet another embodiment according to the present invention.

FIG. 7 is another embodiment of the rotation driving member according to the present invention. Rotation driving member 50 in this embodiment includes pulse motor 51 as a drive motor and omits angular transmitter 29. In this embodiment, every stepped rotation driven by pulse motor 51 corresponds to a scanning interval in a horizontal direction in a measuring plane. Namely, an output shaft of pulse motor 51 disposed to be parallel to a longitudinal direction of frame 11 and rotatably supported to frame 1, integrally connects ball thread 52. Nut 53 is threadably engaged to ball thread 52. Linear guide plate 55 is rotatably supported through bearing 54 to shaft 53a extending perpendicularly relative to thread 52 from nut 53. Mounting plate 56 is slidably supported to linear guide plate 55. An upper end of mounting plate 56 is rotatably supported to frame 11 through bearing 57. Distance measuring member 14 is fixed to mounting plate 56. Rotation movement from pulse motor 51 is transduced rotation movement about center 30 by a transmission mechanism consisting of ball thread 52, nut 53, bearing 54, linear guide plate 55, mounting plate 56 and bearing 57.

The operation of the above construction is carried out as follows. Pulse motor 51 rotates ball thread 52, moving nut 53 in a direction parallel to a longitudinal direction of frame 11. Mounting plate 56 rotates reciprocally about center 30 because the upper end of mounting plate 56 is rotatably supported to frame 11 through bearing 57 and slidably supported to linear guide plate 55 which moves in a direction parallel to the longitudinal direction of frame 11 together with nut 53.

Figure 8:
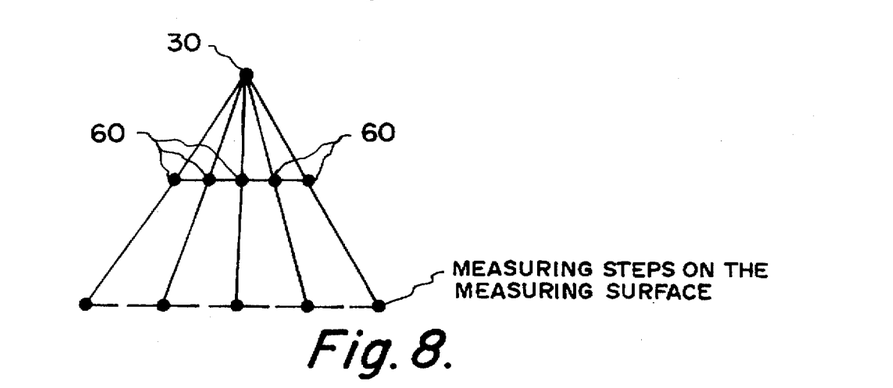
FIG. 8 is an explanatory view showing scanning by the apparatus of FIG. 7.

As shown in FIG. 8, every rotation step of pulse motor 51 corresponds to a displacement point (60, 60, ...) of nut 53 along ball thread 52, and lights from distance measuring member 14 are propagated in a direction from center 30 to displacement points 60, 60, ... so that intervals of measuring step in a horizontal direction on the measuring surface become equal.

Road convex or concave calculator 27 obtains a signal corresponding to rotation angular output $\Theta_1$ from a pulse motor driving circuit 61.

In this embodiment, it is possible to utilize rack and pinion instead of ball thread 52 and nut 53.

Now, FIG. 11 is still another embodiment according to the present invention. An apparatus according to the present embodiment is positioned on sidewalk or outside of the road ER.

In FIG. 11, flame 11-1 disposed on sidewall or outside of the road ER, is an elevating tripod.

Rotation driving member 13 similar to the one in the first embodiment is fixed to a plane portion on the top of the flame 11-1. Distance measuring member 14 is mounted on output shaft 13a of rotation driving member 13. Level 62 is mounted on the housing of rotation driving member 13. Alternatively, level 62 may be directly mounted on flame 11-1.

Rotation driving member 13 also includes angular transmitter 29 not shown for detecting a rotational angle of output shaft 13a, as well as the first embodiment. Distance measuring member 14 is provided with light wave distance measuring equipment 19 which transmits light wave to a road surface as well as the first embodiment. Signals from light wave distance measuring equipment 19 and angular transmitter 29 are fed to a processing unit not shown. The processing unit also includes a time counter, measuring distance calculator and road convex or concave calculator as well as the first embodiment. Measuring distance calculator calculates a distance from light wave distance measuring equipment 19 to the road surface, and road convex or concave calculator 27 obtains data regarding to convex or concave of the road surface by means of the output from angular transmitter 29 of rotation driving member 13. The processing unit connects to a display device. An electric power source feeds electric power to rotation driving member 13 and light wave distance measuring equipment 19 etc.

In the apparatus according to this embodiment positioned on sidewalk or outside of the road ER, the housing of rotation driving member 13 and the plane portion on the top of the flame 11-1 are adjusted to keep horizontal before measuring.

As shown in FIG. 11, distance measuring member 14 attached to rotary output shaft 13a of rotation driving member 13 swings between $\Theta_{1MAX}$ and $\Theta_{1MIN}$ toward the road RD about rotation center 30 from vertical line 32 which is standard line of rotation driving member 13. Rotation angle $\Theta_1$ deviated from vertical line 32 output from angular transmitter 29 is equal to an offset angle $\Theta$ of light axis of distance measuring member 14 deviated from vertical line 33 ($\Theta=\Theta_1$). Assuming that R is a distance from rotation center 30 to reference point 34 of distance measuring member 14 and l is a distance obtained by measuring distance calculator 26 as well as the first embodiment, a vertical distance H and horizontal distance L from rotation center 30 to a measuring point on road surface are obtained by the following equations.

$$H=(R+1)\cos\Theta_1$$

$$L=(R+1)\sin\Theta_1$$

Consequently, in the road convex or concave calculator, already-known R, measuring result 1 and $0_1$ from angular transmitter 29 of rotation driving member 13 are used to calculate H and L. The calculated vertical distance H and horizontal distance L between rotation center 30 and the measuring point on the road surface are fed to display device 17 and plotted in a display of display device 17.

Figure 12:
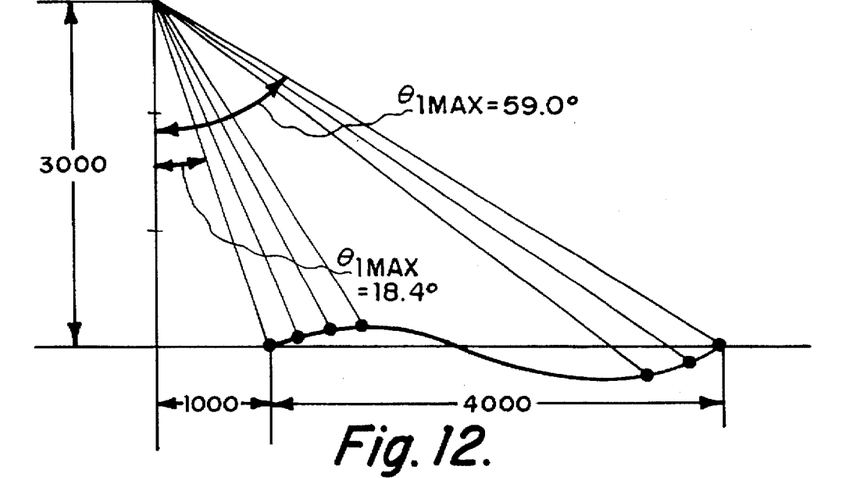
FIG. 12 is a measured result of the apparatus shown in FIG. 11.

FIG. 12 shows an example of a measured results minimum scanning rotation $\Theta_{1MIN}$ is 18.4 degree and maximum scanning rotation angle $\Theta_{1MAX}$ is 59.0 degree, measuring width is 4 m. The lengths in FIG. 12 are shown in mm, each measuring point is plotted by calculated vertical distance H and calculated horizontal distance L between the measuring point and rotation center 30.

As explained above, it is possible to reduce a size and weight of the apparatus as well as the first embodiment. In addition, as the apparatus is positioned on sidewalk or outside of the road ER, there is no need to control cars on the road around the apparatus. Therefore human labors, costs, time which are required to control the cars, can be eliminated, and traffic congestions which would be caused by the apparatus can be avoided. Further, the operations on the roads can be avoided.

Figure 13:
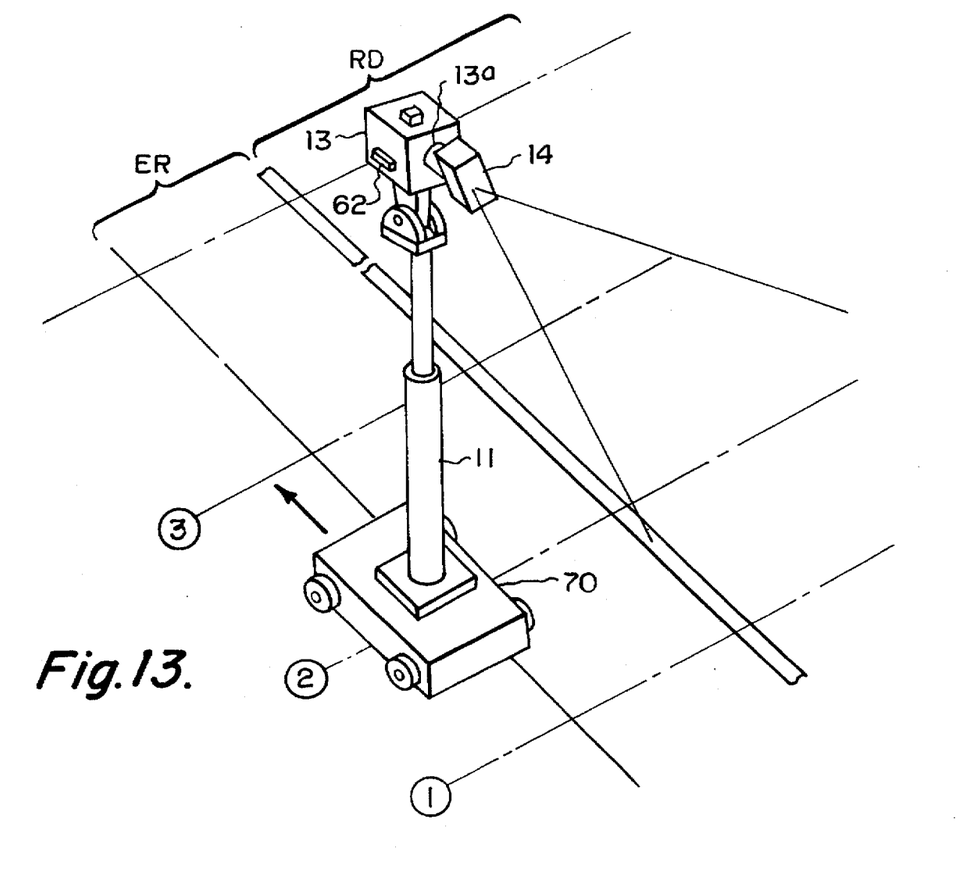
FIG. 13 is a perspective view of an apparatus for measuring the shape of a road surface of yet another embodiment according to the present invention.

FIG. 13 is an example that the apparatus shown in FIG. 11 is mounted on handcart or cart 70 which is moved by a driving mechanism of its own. When handcart or cart 70 stops at the measuring positions 1, 2, , . . . , as shown, distances from the positions 1, 2, . . . , to the road RD in a direction traverse to the road are measured after rotation driving member 13 and the plane portion on the top of the flame 11-1 are adjusted to be horizontal.

Alternatively, in the embodiment shown in FIG. 1, flame 11 can be replaced with flame 11-1 shown in FIG. 11 or FIG. 13 and can be positioned on sidewalk or outside of the road.

In above embodiments, distance measuring member 14 includes light wave distance measuring equipment 19, however it is possible to use conventional measuring member 4, and infrared rays, or ultrasonic waves can be replaced with laser lights.

As explained above, according to this invention, it is possible to reduce a size and weight of the apparatus compared to the road width.

Further, operators do not have to get out of the vehicle during measuring and they do not have to unload the apparatus from the vehicle once the apparatus is mounted on the vehicle. As a result, human labors and dangerous works on roads can be eliminated.

In addition, the case where the apparatus is positioned on sidewalk or outside of the road ER, there is no need to control cars on the road around the apparatus. Therefore human labors, costs, time which would be required to control the cars, can be eliminated, and traffic congestions which would be caused by the apparatus can be avoided.

Further, costs for producing the apparatus can be decreased because its measuring mechanism is simple.

Having described the preferred embodiments of the invention with reference to the accompanying drawings, it is to be understood that the invention is not limited to those precise embodiments, and that various changes and modifications may be effected therein by one skilled in the art without departing from either the scope or spirit of the invention as defined in the appended claims.

What is claimed is:

1. An apparatus mounted on a vehicle for measuring the shape of a road surface comprising; rotatable distance measuring means for measuring the distance to said road surface; rotation drive means for rotating said rotatable distance measuring means in a vertical plane; inclinometer means detecting an inclination angle of said rotation drive means; data processing means receiving a distance signal from said rotatable distance measuring means representing the distance to said road surface, a rotation angle signal from said rotation drive means indicating the rotation angle of said rotatable distance measuring means, and an inclination angle signal representing the inclination angle of said rotation drive means detected by said inclinometer means; said data processing means calculating a vertical distance and horizontal distance to said road surface from said distance signal, said rotation angle signal and said inclination angle signal.

2. The apparatus according to claim 1 in which said distance measuring means comprises light emitting distance measuring means for emitting a light wave toward said road surface and receiving a reflection of said light wave from said road surface.

3. The apparatus according to claim 1 in which said rotation drive means comprises; pulse motor means; pulse motor drive means for driving said pulse motor means; said rotation angle signal being output by said pulse motor drive means.

4. The apparatus according to claim 1 in which said rotation drive means comprises; pulse motor means for generating a rotational motion; transducer transmitting means for transducing rotational motion into reciprocal linear motion and rotational motion about a predetermined rotation center in a substantially vertical plane; and pulse motor drive means for driving said pulse motor; said rotation angle signal being output by said pulse motor drive means.

* * * * *

UNITED STATES PATENT AND TRADEMARK OFFICE
CERTIFICATE OF CORRECTION

PATENT NO. : 5,745,225
DATED : April 28, 1998
INVENTOR(S) : Hiromitsu Watanabe, et. al.

It is certified that error appears in the above-identified patent and that said Letters Patent is hereby corrected as shown below:

Colume 1, line 25, after "according" insert -- to --;
        line 29, change "Apart" to -- A part --;
        line 50, change "stops" to --steps--;
        line 53, change "frame of" to -- frame in --;
        line 54, change "in" to --of--.

Column 2, line 30, change "regarding" to --related--;
        line 53, delete "an";
        line 66, change "of the still" to -- of still --.

Column 3, line 28, change "backs" to -- back --.

Column 4, line 23, after "Offset" insert -- angle $\theta$ --;
    line 28, change "$\theta = \theta_1+\theta$:" to -- $\theta=\theta_1+\theta_0$ --;
    line 37, change "H = (R+1) cos = (R+1) cos ($\theta_1-\theta$)" to
        -- H = (R+1) cos $\theta$ = (R+1) cos ($\theta_1+\theta_0$) --;
    line 38, change "L = (R+1) sin = (R+1) sin ($\theta+0$)" to
        -- L = (R+1) sin $\theta$ = (R+1) sin ($\theta_1+\theta_0$) --.

Signed and Sealed this

Twentieth Day of October, 1998

*Attest:*

BRUCE LEHMAN

*Attesting Officer*      *Commissioner of Patents and Trademarks*